May 13, 1952 R. W. ERICKSON 2,596,767
SHEAR PIVOT
Filed Feb. 24, 1947
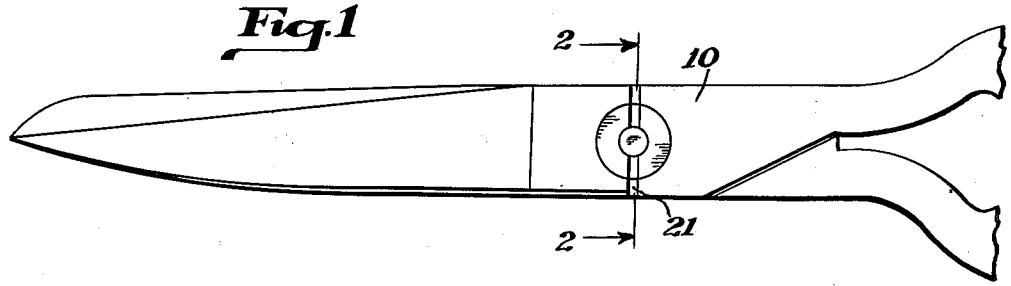
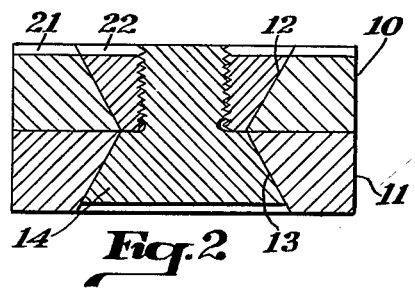
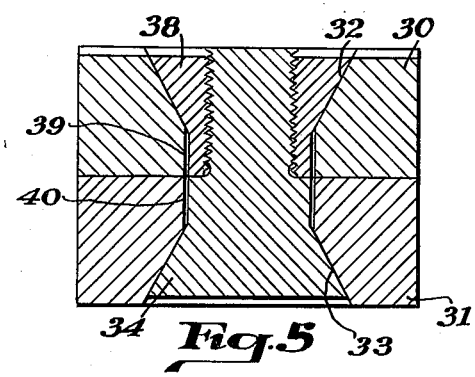
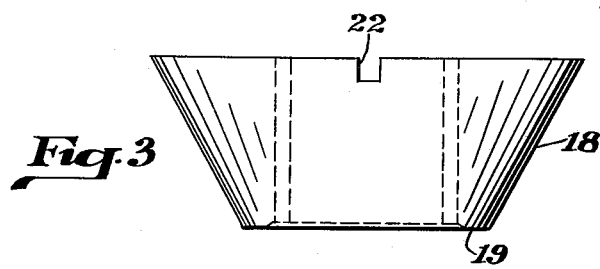
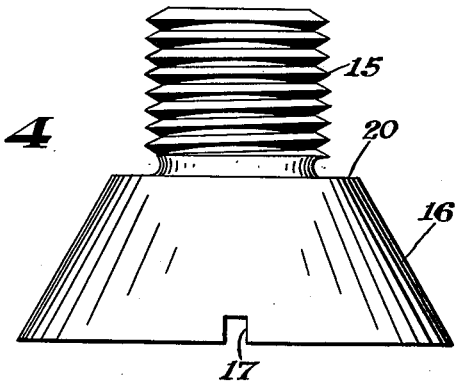
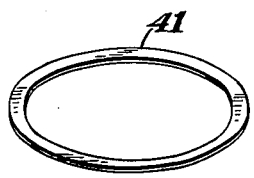
INVENTOR.
REINHOLD W. ERICKSON.
BY
ATTORNEYS.

Patented May 13, 1952

2,596,767

UNITED STATES PATENT OFFICE 2,596,767

SHEAR PIVOT

Reinhold W. Erickson, Cleveland, Ohio

Application February 24, 1947, Serial No. 730,635

4 Claims. (Cl. 30—266)

This invention relates broadly to shears and other tools which embody articulated arms and more specifically to improvements in the construction of pivot pins therefor.

One of the objects of the invention is to provide a pivot mechanism for shears which will accommodate ready adjustment of the tension between the blades of the shears.

Another object is to provide a pivot pin having large bearing surfaces compressively forcing the blades in impinged relation.

A further object is to provide a pivot mechanism in which the cooperating elements forming the journal for the blades may be readily and effectively secured in their adjusted position.

Another object is to provide a pivot pin for shears having tapered bearing surfaces which serve as pivot journals for the arms as well as compressive surfaces for forcing the arms into impingement.

Other objects and advantages more or less ancillary to the foregoing and the manner in which all the various objects are realized will appear in the following description, which, considered in connection with the accompanying drawings, sets forth the preferred embodiment of the invention.

Referring to the drawings wherein is illustrated the preferred embodiment of the invention:

Fig. 1 is an elevational view of a fragmentary portion of a pair of shears or scissors embodying the improved pivot pin;

Fig. 2 is a transverse sectional view of the tool shown in Fig. 1, the section being taken on line 2—2 of Fig. 1;

Figs. 3 and 4 are elevational views of the nut and bolt, respectively, of the improved pivot;

Fig. 5 is a view similar to Fig. 2 of a modified form of pivot; and

Fig. 6 is a perspective view of a shim or washer which may be used as an adjusting medium in the improved pivot pin assembly.

Referring first to Fig. 1 which shows a pair of shears embodying the improved pivot, the blades 10 and 11 are formed in the usual manner with finger grips (not shown) integral with the rearward ends of the blades. As shown in Fig. 2, the blades are drilled and machined to form conical bearing seats 12 and 13 respectively.

The bolt 14 for the pivot pin is formed with a threaded shank 15 which protrudes from a frusto-conical head 16 machined in complementary configuration to the conical bearing seat 12. The face of the bolt head is formed with a slot or other recess 17 adapted to receive a wrench, screw driver or similar tool.

The nut 18 is preferably formed identical in height and taper to the bolt head 16, the large end thereof being provided with a slot 22. The inner, flat surface 19 of the nut, as well as the opposed shoulder 20 of the bolt, are machined for abutting engagement with each other when mounted in assembled relation with the blades and drawn together by the nut 18.

In the embodiment shown in Fig. 2, the impinged surfaces 19 and 20 of the nut 18 and the bolt head 16 lie substantially in the plane of the contiguous inner faces of the blades 10 and 11. The conical faces of the bolt and nut are designed to exert a slight compressive effort upon the blades when the faces 19 and 20 of the bolt and nut are drawn into abutting engagement with each other frictionally locked. The cones 16 and 18 serve as journals for the rotative movement of the blades during the operation of the shears.

Referring to Figs. 1 and 2, the face of the blade 10 is machined with a slot 21 disposed in diametric relation to the bearing seat 12 and across the medial axis of the blade. During the assembly operation, the nut 18 may be readily locked against rotation while turning the bolt, by the insertion of the blade of a screw driver or similar tool into a portion of the slot 21 in the blade and the contiguous portion of the slot 22 in the nut.

From the foregoing it will readily be perceived that as the blades of the tool become loose due to wear of the bearing seats and the journals, the improved pivot pin may be easily and accurately adjusted by disassembling the pin as shown in Figs. 3 and 4, surface grinding the flat, inner face 20 of the nut, then reassembling the pin in the tool. This machining operation upon the face 20 increases the compressive force urging the blades together and removes any undesirable "play" transverse to the pivot axis.

Prior to the present invention, pivot pins for tools such as scissors, pliers, tinners' shears, etc. have been formed with cylindrical journal members for the rotational support of the arms. In many of such tools, the pivot is formed by a machine screw having an unthreaded portion adjacent the head to serve as a journal for one of the arms, the impingement of the articulate arms being effected by the engagement of the threads of the pivot screw in one arm and the head with the other arm. The screw is then riveted to prevent loosening. In such tools, if subject to hard usage, the journal and bearing are invariably worn out of round and the wear upon the screw head diminishes the compressive forces on the arms.

In prior attempts to provide adjustable pivot pins, many devices have been provided with means for increasing the compressive forces on the arms consonant the diminution thereof occasioned by the wear of the head and/or other transverse surfaces of the pin members. However, none of these adjustable pins provide any means for adjusting the pivot pin elements to eliminate undesirable "out of round" clearance around the journal surfaces of the pin. In the present invention the conical journal members serve as journals and compressive elements and the two adjustments are interdependent. Thus the simple tightening operation heretofore described effects a proper journal fit as well as a proper compressive action between the blades or arms.

The conical conformation of the bearing members provides a relatively large journal area. This is especially important in the reduction of wear in tools subject to severe shearing stress and frequent use. In such tools, it has been found desirable to form the pivot parts from a hard ferrous metal which is wear-resistant.

Fig. 5 shows a modified form of pivot which is adapted particularly for use in tools having heavy, thick blades. The blades 30 and 31 are drilled and machined as in the tool heretofore described save that the conical bearing seats 32 and 33 terminate within the blades. Thus the bolt 34 and nut 38 are formed with frusto-conical end portions merged with cylindrical shanks 39 and 40 adapted to meet in abutting relation substantially in the plane of the inner surfaces of the blades when the pivot pin is assembled in the tool. The drilled hole in the blades is preferably slightly larger in diameter than the cylindrical shanks 39 and 40 so that the conical surfaces will function as journals for the rotary motion of the blades.

The blades of a worn tool embodying the improved pivot may be easily and accurately adjusted as heretofore described by grinding the abutting surface of the nut until the desired frictional engagement between the cones and seats therefor is obtained. Should an excess amount of metal be ground from the nut, a shim 41 (Fig. 6) of a suitable thickness may be inserted between the locking surfaces of the nut and bolt. The subsequent adjustment thereof is effected by the removal of the shim or washer or by the replacement thereof by a shim of lesser thickness.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In a pair of shears embodying a pair of articulated blades having tapered bearing seats therein, a pivot for the blades comprising a frusto-conical journal member, a cylindrical shank integral therewith and merged with the smaller end thereof, a second frusto-conical journal member, a cylindrical shank integral therewith and merged with the smaller end thereof, and means for the support of the free ends of said shanks in impinged relation.

2. In a tool embodying two pivotally supported members having conical bearing seats therein, a pivot therefor comprising a bolt, a conical head thereon, a cylindrical shank thereon, a threaded portion on said shank, a shoulder adjacent the inner end thereof, a nut, a conical head thereon, a cylindrical shank thereon, the free end thereof being disposed in impinged relation with said shoulder.

3. A pair of shears comprising two cooperating blades having tapered bearing seats therein, a tapered journal element in one of said bearing seats, a threaded shank extending from the smaller end of said journal element, an annular shoulder on the element circumjacent said shank, a second tapered journal element constituting a nut in the other of said bearing seats engaged with said threaded shank, and an annular shoulder on the smaller end of said second journal element disposed in abutting engagement with the annular shoulder on the first-named element.

4. A tool comprising two members relatively rotatable about an axis and abutting in a plane perpendicular to the axis, a bore in each member forming a conical bearing concentric with the axis, two journal elements formed with inner faces adapted to impinge adjacent the said plane and with conical journals spaced from the faces adapted to seat rotatably in the said bearings when the faces of the elements are impinged, and means for retaining the elements with their inner faces in impinged relation comprising internal threads on one member and external threads on the other member.

REINHOLD W. ERICKSON.

REFERENCES CITED

The following references are of record in the file of this patent:

UNITED STATES PATENTS

| Number | Name | Date |
| --- | --- | --- |
| 624,175 | Chapman | May 2, 1899 |

FOREIGN PATENTS

| Number | Country | Date |
| --- | --- | --- |
| 105,402 | Germany | Sept. 5, 1899 |